(12) United States Patent
Higashida

(10) Patent No.: US 7,167,991 B2
(45) Date of Patent: Jan. 23, 2007

(54) METHOD FOR REDUCING LEAKAGE CURRENT OF LSI

(75) Inventor: Motoki Higashida, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 417 days.

(21) Appl. No.: 09/901,083

(22) Filed: Jul. 10, 2001

(65) Prior Publication Data

US 2002/0091978 A1 Jul. 11, 2002

(30) Foreign Application Priority Data

Dec. 26, 2000 (JP) ............................ 2000-396005

(51) Int. Cl.
*G06F 1/32* (2006.01)

(52) U.S. Cl. ..................... 713/320; 713/323; 713/324

(58) Field of Classification Search ........ 713/300–340; 714/30

See application file for complete search history.

(56) References Cited

U.S. PATENT DOCUMENTS 6,363,501 B1 * 3/2002 Tobias et al. .................. 714/30
6,535,982 B1 * 3/2003 Kawabe et al. ............. 713/300
6,684,275 B1 * 1/2004 Goldstein .................... 710/71

FOREIGN PATENT DOCUMENTS

JP A 5-108194 4/1993
JP A 6-52686 2/1994

OTHER PUBLICATIONS

"IEEE Standard Test Access Port and Boundary-Scan Architecture", 1993, Institute of Electrical and Electronics Engineers, Inc., pp. 9-14.*

* cited by examiner

*Primary Examiner*—Lynne H. Browne
*Assistant Examiner*—Paul Yanchus, III
(74) *Attorney, Agent, or Firm*—Buchanan Ingersoll & Rooney PC

(57) ABSTRACT

There is disclosed a method for reducing leakage current of an LSI, which enables information not memory-mapped in the address of a CPU to be easily saved, and information saving and returning to be carried out by simple switching operations without needing any special switching operations by the CPU. An LSI chip is divided into two parts, namely a main power supply region and a backup power supply region. A scan path is provided to interconnect memory units including a CPU, a CPU peripheral circuit and so on, in the main power supply region. When an operation standby state is set, a scanning operation through the scan path is started, information held in the memory units of each of the circuits in the main power supply region is read, and then thus read information is saved in an storage section in the backup power supply region.

14 Claims, 7 Drawing Sheets

METHOD FOR REDUCING LEAKAGE CURRENT OF LSI

BACKGROUND OF THE INVENTION

1. Field of the Invention

The present invention relates to a method for reducing leakage current of an LSI, which is designed to reduce power consumption in an LSI chip. More particularly, the invention relates to a method for reducing leakage current of an LSI, which is designed to suppress an increase in power consumption caused by leakage current in an operation standby state.

2. Description of the Related Art

In an LSI used for a portable electronic device such as a portable telephone set or the like, a reduction in power consumption represents an important ongoing goal. There are generally two factors in power consumption in such an LSI, i.e., power consumption by the switching operation of a transistor, and power consumption by the leakage current of a transistor. In the case of the portable telephone set, the signal flow in the logic unit of the LSI is stopped in an operation standby state resulting in almost no switching operations being performed in the transistor. Accordingly, a reduction in the leakage current of the transistor is effective for reducing power consumption in an operation standby state at the portable telephone set.

FIG. 7 is a block diagram illustrating a reduction in leakage current in a system using the LSI of the related art. Here, an example of a system configuration using an LSI chip with a built-in CPU, and an external ROM, is specifically shown. In the drawing, a reference numeral 1 denotes an LSI chip; 2 an external ROM; 3 a main power source; 4 a main power supply and current cut-off switch; 5 a backup power source; and 6 a return trigger circuit. Inside the LSI chip 1, there are provided components including: a CPU 11; a CPU peripheral circuit 12; a data bus 13; an address bus/control signal line 14; a built-in SRAM 15; an internal current cut-off switch 16; and a power supply cut-off controller 17. A reference numeral 18 denotes a main power supply region; and 19 a backup power supply region.

The operation of an LSI chip as configured above will now be described as below.

The system shown comprises two types of power sources, i.e., the main and backup power sources 3 and 5. Power is supplied from each of these main and backup power sources 3 and 5 to the LSI chip 1, for which measures must be taken to deal with current leakage. In addition, power is supplied from the main power source 3 to the external ROM 2 provided outside the LSI chip, and power is supplied from the backup power source 5 to the return trigger circuit 6 for generating a trigger of return from an operation standby state. Power supply from the main power source 3 is carried out through the main power supply and current cut-off switch 4. When the system is placed in an operation standby state, the main power supply and current cut-off switch 4 is turned off to stop supplying operation power to the LSI chip 1 and to the external ROM 2.

The inside of the LSI chip 1 is divided into two parts, i.e., the main power supply region 18 for receiving power supplied from the main power source 3, and the backup power supply region 19 for receiving power supplied from the backup power source 5. In the backup power supply region 19, the power supply cut-off controller 17 for performing switch control for the main power supply and current cut-off switch 4, and the built-in SRAM 15 necessary for saving stored content, are disposed. In the main power supply region 18, the other components including the CPU 11 and the CPU peripheral circuit 12 are disposed. Each circuit of the main power supply region 18 receives power supplied from the main power source 3 in order to be operated. Each circuit of the backup power supply region 19 receives power supplied from the backup power source 5 in order to be operated.

When the LSI chip 1 is placed in an operation standby state, the main power supply and current cut-off switch 4 is turned off through the power supply cut-off controller 17 to cut off the supply of operation power to the main power supply region 18. Consequently, a voltage level inside the main power supply region 18 becomes unstable. On the other hand, a voltage inside the backup power supply region 19 is maintained at a normal level. Thus, to prevent the unexpected flow of current between the main and backup power supply regions 18 and 19, the wiring of the main and backup power supply regions 18 and 19 is interconnected through the internal current cut-off switch 16 in such a manner as to be electrically disconnected when power supply is cut off.

When the LSI chip 1 is placed in the standby state, causing power supplied to the CPU 11 and the CPU peripheral circuit 12 inside the main power supply region 18 to be cut off, information held in the memory units of the main power supply region thereof may be lost. Thus, before the power supplied from the main power source 3 is cut off, the information of each of such memory units is saved in the built-in SRAM 15 inside the backup power supply region 19. The saving of each of such stored information in the built-in SRAM 15 is carried out by the switching operation of the CPU 11. After the power supplied from the power source 3 has been cut off, a portion to which power is being supplied is only the backup power supply region 19. Accordingly, compared with a case where power is supplied to the entire LSI chip 1, the number of transistors to receive power supply is reduced. As a result, it is possible to reduce the amount of current leakage for the LSI chip 1 as a whole.

One of the documents disclosing technologies more or less related to the foregoing method for reducing leakage current of the LSI in the related art is, for example, Japanese Patent Application Laid-Open No. 1994-52686, which describes a technology regarding an LSI chip capable of ensuring protection of the content of a memory for a long time by a small battery.

Since the leakage current reducing method of the LSI of the related art is constructed in the foregoing manner, information held in the memory unit of the CPU 11 or the CPU peripheral circuit 12 may be lost when the power supplied from the main power source 3 is cut off. Thus, to prevent such a loss of information, necessary information must be saved in the SRAM 15 disposed inside the backup power supply region 19 before power supply from the main power source 3 is cut off. However, certain problems remain. Examples include the difficulty of saving information not memory-mapped in the address of the CPU 11, the necessity of performing complex switching operations by the CPU 11 to save information before the power supplied from the main power source 3 is cut off, and to return information when power supply is resumed, and so on.

SUMMARY OF THE INVENTION

The present invention has been made to solve the foregoing problems. It is an object of the invention to provide a novel method for reducing leakage current of an LSI, which enables even information not memory-mapped in the address of a CPU to be easily saved, and such information saving and returning to be carried out by a relatively simple switching operation without the need for any special switching operations by the CPU.

In accordance with the invention, there is provided a leakage current reducing method of an LSI chip for reducing leakage current in an LSI chip configured by two parts; namely a main power supply region and a backup power supply region, and a scan path being provided in the LSI chip. In this case, the method comprises the steps of: connecting memory units of each of the circuits provided in the main power supply region through the scan path; when the LSI chip is placed in an operation standby state, starting a scanning operation through the scan path, and reading information held in the memory unit of each circuit provided in the main power supply region; and saving the read information in a built-in SRAM provided in the backup power supply region.

According to the leakage current reducing method of an LSI of the invention, the saving step is conducted into a scanned information storing SRAM, which is separately provided from the built-in SRAM, in a case where the built-in SRAM is used also for a normal operation.

According to the leakage current reducing method of an LSI of the invention, a scan path originally provided for testing the LSI chip is used as the scan path for reading information held in the memory units of each of the circuits provided in the main power supply region.

According to the leakage current reducing method of an LSI of the invention, a part of the built-in SRAM provided in the back up power supply region is used as a scanned information storage portion for storing the information read by the scanning operation, which method comprising the steps of: starting the scanning operation, when the LSI chip is placed in the standby state, through the scan path, serially reading the information held in the memory units of each of the circuits provided in the main power supply region, converting the read serial information into parallel information, and saving the thus converted parallel information in specified addresses of the scanned information storage portion of the built-in SRAM; and parallely reading, when the LSI chip is returned from the standby state, the information held in the scanned information storage portion of the built-in SRAM by specifying addresses therefor, converting the read parallel information into serial information, and setting the serial information through the scan path in the memory units of each of the circuits provided in the main power supply region.

According to the leakage current reducing method of an LSI of the invention, the method comprises a step of increasing a substrate bias voltage of a transistor of each of the circuits provided in the backup power supply region while the LSI chip is in the operation standby state.

According to the leakage current method of an LSI of the invention, the method comprises the step of supplying power to the backup power supply region from the main power source in a normal operation state, and from the backup power source in an operation standby state.

In accordance with the invention, there is provided a leakage current reducing method of an LSI for reducing leakage current in an LSI chip composed of two parts; namely a main power supply region and a backup power supply region, and a scan path being provided in the LSI chip. In this case, the method comprises the steps of: connecting the memory units of each of the circuits provided in the main power supply region through the scan path and connecting an external SRAM operated by receiving power from the backup power source outside the LSI chip; starting a scanning operation, when the LSI chip is placed in an operation standby state, through the scan path, serially reading information held in the memory units of each of the circuits provided in the main power supply region, converting the read serial information into parallel information, and then saving the parallel information in the external SRAM by specifying addresses therefor; and parallely reading, when the LSI chip is returned from the standby state, the information held in the external SRAM by specifying addresses therefor, converting the read parallel information into serial information, and then setting the serial information in the memory units of each of the circuits provided in the main power supply region through the scan path.

DETAILED DESCRIPTION OF THE PREFERRED EMBODIMENTS

Next, the preferred embodiments of the present invention will now be described with reference to the accompanying drawings.

First Embodiment

Figure 1:
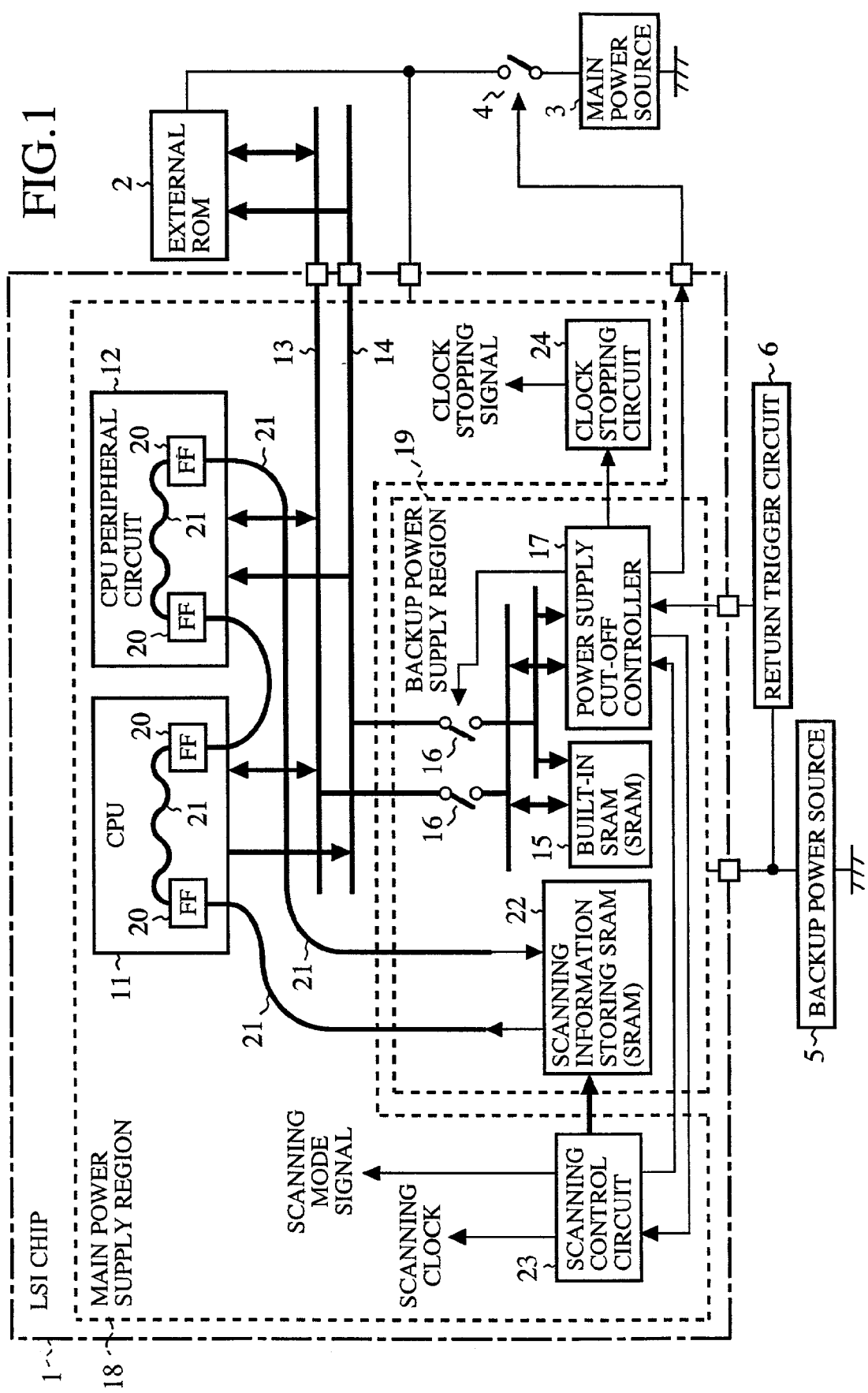
FIG. 1 is a block diagram showing an LSI chip, to which a leakage current reducing method of an LSI according to a first embodiment of the present invention is applied.

FIG. 1 is a block diagram showing an LSI chip, to which the leakage current reducing method of an LSI according to the first embodiment of the invention is applied. Here, as in the case of the related art, an example of a system configuration using an LSI chip with a built-in CPU, and an external ROM, is specifically shown. In the drawing, a reference numeral 1 denotes an LSI chip with a built-in CPU; 2 an external ROM provided outside the LSI chip 1; 3 a main power source for supplying operation power to the LSI chip 1; 4 a main power supply and current cut-off switch for cutting off the supply of operation power from the main power source 3 to the LSI chip 1 in an operation standby state; 5 a backup power source for supplying necessary power to the LSI chip 1 placed in an operation standby state; and 6 a return trigger circuit for generating a return trigger to return the LSI chip 1 from the operation standby state.

In the LSI chip 1, there are provided components including: a CPU 11 incorporated in the LSI chip 1; a CPU peripheral circuit 12 used during the control operation of the CPU 11; a data bus 13 for transferring data between the CPU 11 and the CPU peripheral circuit 12 or the external ROM 2; an address bus/control signal line 14 for transmitting an address or a control signal specified by the CPU 11; a built-in SRAM 15 for saving data necessary during the normal operation or in the operation standby state of the LSI chip 1; an internal current cut-off switch 16 turned on/off to connect or disconnect the data bus 13 or the address bus/control signal line 14 to or from the built-in SRAM 15 and a power supply-cut-off controller (described later); and a power supply cut-off controller 17 for cutting off the supply of power from the main power source 3 to the LSI chip 1 by turning off the main power supply and current cut-off switch 4 in an operation standby state based on a CPU instruction and a signal from the return trigger circuit 6, and controlling the turning on/off of the internal current cut-off switch 16.

Figure 7:
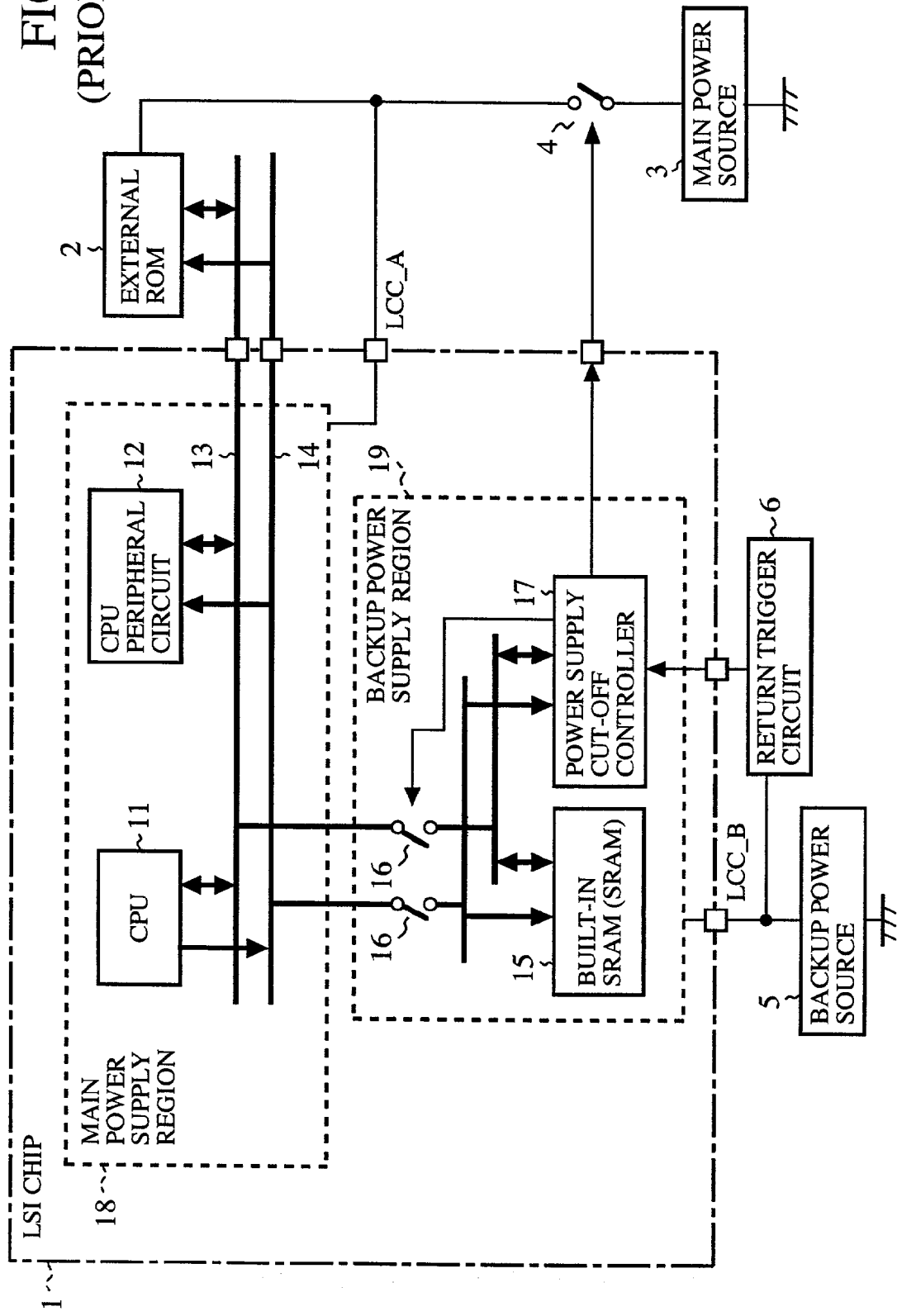
FIG. 7 is a block diagram showing an LSI chip, to which a conventional leakage current reducing method of an LSI is applied.

A reference numeral 18 denotes a main power supply region, in which the CPU 11, the CPU peripheral circuit 12, and so on, operated by receiving power from the main power source 3, are disposed. A reference numeral 19 denotes a backup power supply region in which are disposed the built-in SRAM 15, the internal current cut-off switch 16, the power supply cut-off controller 17, and so on, operated by receiving power from the backup power source 5 in the standby state of the LSI chip 1. The LSI chip 1 is divided into the two parts, i.e., the main and backup power supply regions 18 and 19. These portions are equivalent to those denoted by similar reference numerals, shown in FIG. 7.

A reference numeral 20 denotes a memory-unit provided in each circuit such as the CPU 11, the CPU peripheral circuit 12 or the like located in the main power supply region 18, and designed to store information at a current time thereof. In the described case, a flip-flop (FF) is used as the memory unit. A reference numeral 21 denotes a scan path provided to cascade-connect FF units as such memory units 20 in the form of a shift register, and start a scanning operation when the LSI chip 1 is placed in an operation standby state or returned to an operation state from the standby state; 22 a scanned information storing SRAM for saving information of each memory unit 20 read by the scanning operation of the scan path 21; 23 a scanning control circuit for transferring a control signal to or receiving from the power supply cut-off controller 17, generating a scanning clock and a scan mode signal based on the thus transferred signal, and controlling the scanning operation of the scan path 21 by sending an SRAM control signal to the scanned information storing SRAM 22; and 24 a clock stopping circuit for generating a clock stopping signal according to an instruction from the power supply cut-off controller 17.

The scanning control circuit 23 and the clock stopping circuit 24 are new components set up in the main power supply region 18. The scanned information storing SRAM 22 is a new component set up in the backup power supply region 19.

Next, the operation of an LSI chip as configured above will now be described as below.

The system shown in FIG. 1 comprises two types of power sources, i.e., the main power source 3 for supplying operation power during the normal operation of the LSI chip 1, and the backup power source 5 for supplying power in the operation standby state thereof. The external ROM 2 is attached outside the LSI chip 1, and receives power from the power source 3. The return trigger circuit 6 for generating a trigger of return from the operation standby state receives power from the power source 5. Since measures must be taken to deal with current leakage, power is supplied to the LSI chip 1 not only from the main power source 3 but also from the backup power source 5. In the described case, power supply from the main power source 3 is carried out through the main power supply and current cut-off switch 4. When the system is placed in an operation standby state, an instruction is issued from the power supply cut-off controller 17 to turn off the main power supply and current cut-off switch 4, and accordingly the supply of operation power to the LSI chip 1 and the external ROM 2 is stopped.

The inside of the LSI chip 1 is divided into two parts, i.e., the main power supply region 18 operated by receiving power from the main power source 3, and the backup power supply region 19 operated by receiving power from the backup power source 5. The components disposed in the backup power supply region 19 include the power supply cut-off controller 17 for controlling the main power supply and current cut-off switch 4 and the internal current cut-off switch 16, the built-in SRAM 15 necessary for saving a stored content when the power from the main power source 3 is cut off, and the scanned information storing SRAM 22. On the other hand, in the main power supply region 18, the other components including the CPU 11, the CPU peripheral circuit 12, the scanning control circuit 23 and the clock stopping circuit 24 are disposed. Each circuit in the main power supply region 18 is driven by power supplied from the main power source 3. Each circuit in the backup power supply region 19 is driven by power supplied from the backup power source 5.

In the described case, when the LSI chip 1 is placed in an operation standby state, the CPU 11 controls the main power supply and current cut-off switch 4 through the power supply cut-off controller 17. The main power supply and current cut-off switch 4 is accordingly turned off to cut off the supply of power from the main power source 3. After the supply of operation power from the main power source 3 to the main power supply region 18 has been cut off, a voltage level inside the main power supply region 18 becomes unstable. On the other hand, since the supply of power from the backup power source 5 is not cut off, a voltage inside the backup power supply region 19 is maintained at a normal level.

When the voltage level becomes unstable in the main power supply region 18 while the normal voltage level is maintained in the backup power supply region 19, an unexpected flow of current may occur between the main and backup power supply regions 18 and 19. Thus, the wiring of each of the data bus 13, the address bus/control signal line 14, and so on, in the main power supply region 18, is connected through the internal current cut-off switch 16 to a wiring in the backup power supply region 19. When the supply of power from the main power source 3 is cut off, the CPU 11 turns off the main power supply and current cut-off switch 4 through the power supply cut-off controller 17. Then, the main and backup power supply regions 18 and 19 are electrically disconnected from each other. As a result, no unexpected flows of current occur when the supply of power from the main power source 3 is cut off. For the internal current cut-off switch 16, a pass-transistor or the like can be used.

After the LSI chip 1 has been placed in the standby state, the CPU 11 notifies the power supply cut-off controller 17 of the change to the standby state. Upon having received the notification, the power supply cut-off controller 17 instructs the clock stopping circuit 24 to stop clock supply, and the scanning control circuit 23 to start a scanning operation.

Having been instructed to start the scanning operation, the scanning control circuit 23 sends an SRAM control signal to the scanned information storing SRAM 22, asserts a scan mode signal, and generates a scanning clock. After the scan mode signal has been asserted, the scan path 21 is actuated to start the scanning operation, and performs a shifting operation for each pulse of a scanning clock. When the scan mode signal from the scanning control circuit 23 is negated, a normal FF operation can be carried out in each memory unit 20.

By the scanning operation of the scan path 21, information held in each memory unit 20 of the CPU 11 or the CPU peripheral circuit 12 in the main power supply region 18 is read. The read information of each memory unit 20 is passed through the scan path 21 and then stored in the scanned information storing SRAM 22. In this case, an address or a control signal necessary for writing operation into the scanned information storing SRAM 22 is supplied thereto as an SRAM control signal from the scanning control circuit 23. After the end of the scanning operation performed for all the memory units 20 by using the scan path 21, the scanning control circuit 23 notifies the end of the scanning operation to the power supply cut-off controller 17. Upon having received the notification, the power supply cut-off controller 17 asserts a signal for stopping the supply of power from the main power source 3, and turns off the main power supply and current cut-off switch 4. Accordingly, the supply of power from the main power source 3 to the LSI chip 1 and the external ROM 2 is cut off.

As described above, the information held in each memory unit 20 of the CPU 11 or the CPU peripheral circuit 12 in the main power supply region 18 is saved in the scanned information storing SRAM 22 in the backup power supply region 19, and then the supply of power from the main power source 3 is cut off. Thus, information held in such a memory unit 20 can be prevented from being lost. After the supply of power from the main power source 3 has been cut off, a portion in the LSI chip 1, to which power is being supplied, is only the backup power supply region 19. Therefore, compared with a case where power is supplied to the entire LSI chip 1, the number of transistors to receive power supply is reduced. As a result, it is possible to reduce the amount of current leakage for the LSI chip 1 as a whole.

To return from the standby state, the externally connected return trigger circuit 6 enters a return trigger to the LSI chip 1. In the LSI chip 1, the power supply cut-off controller 17 receives this return trigger. Upon having received the return trigger, the power supply cut-off controller 17 asserts a signal for returning the supply of power from the main power source 3, and turns on the main power supply and current cut-off switch 4. Accordingly, the supply of power from the main power source 3 to the LSI chip 1 and the external ROM 2 is resumed. When the resumed supply of power is stabilized, the internal current cut-off switch 16 placed in the off state when the supply of power from the main power source 3 was cut off is turned on. By turning on the internal current cut-off switch 16, the wiring of the main and backup power supply regions 18 and 19 of the LSI chip 1 is electrically connected with each other. The power supply cut-off controller 17 instructs the scanning control circuit 23 to start a scanning operation. Upon having received the instruction of starting the scanning operation, the scanning control circuit 23 sends an SRAM control signal to the scanned information storing SRAM 22, generates a scanning clock, and asserts a scan mode signal. In this way, the scanning operation by the scan path 21 is started, and information which was held in each memory unit 20 of the CPU 11 or the CPU peripheral circuit 12 in the main power supply region 18 before the change to the standby state, and saved thereafter in the scanned information storing SRAM 22, is set through the scan path 21 in each memory unit 20 of the CPU 11 or the CPU peripheral circuit 12.

Subsequently, the power supply cut-off controller 17 instructs the clock stopping circuit 24 to start a clock supplying operation. Upon having received the instruction of starting the clock supplying operation, the clock stopping circuit 24 generates a clock. The CPU 11 or the CPU peripheral circuit 12 having the information before the change to the standby state set in its memory unit 20 receives this clock, and then resumes its operation from the state before the change to the standby state.

As described above, according to the first embodiment, the scanned information storing SRAM 22 is provided in the backup power supply region 19 of the LSI chip 1, and connected through the scan path 21 to the memory units 20 of the CPU 11, the CPU peripheral circuit 12, and so on in the main power supply region 18. When the system is placed in an operation standby state, information held in the memory unit 20 of the CPU 11 or the like is read through the scan path 21, and saved in the scanned information storing SRAM 22. When the system is returned from the standby state, the information stored in the scanned information storing SRAM 22 is set through the scan path 21 in the original memory unit 20 of the CPU 11 or the like. Thus, it is possible to realize a leakage current reducing method of an LSI capable of carrying out information saving and returning by a relatively simple switching operation without needing any special switching operations by the CPU 11, and resuming the operation immediately after the change to the standby state. Moreover, this method is capable of easily saving even information not memory-mapped in the address of the CPU 11.

Second Embodiment

In the foregoing first embodiment, the scan path 21 was newly provided to reduce leakage current during information saving or returning. However, there is a case in which a scan path for facilitating the testing of the CPU 11 or the CPU peripheral circuit 12 is already provided in the LSI chip 1. This existing scan path for testing can be used also as a scan path for reducing leakage current when the LSI chip 1 is placed in an operation standby state or returned from the standby state.

Figure 2:
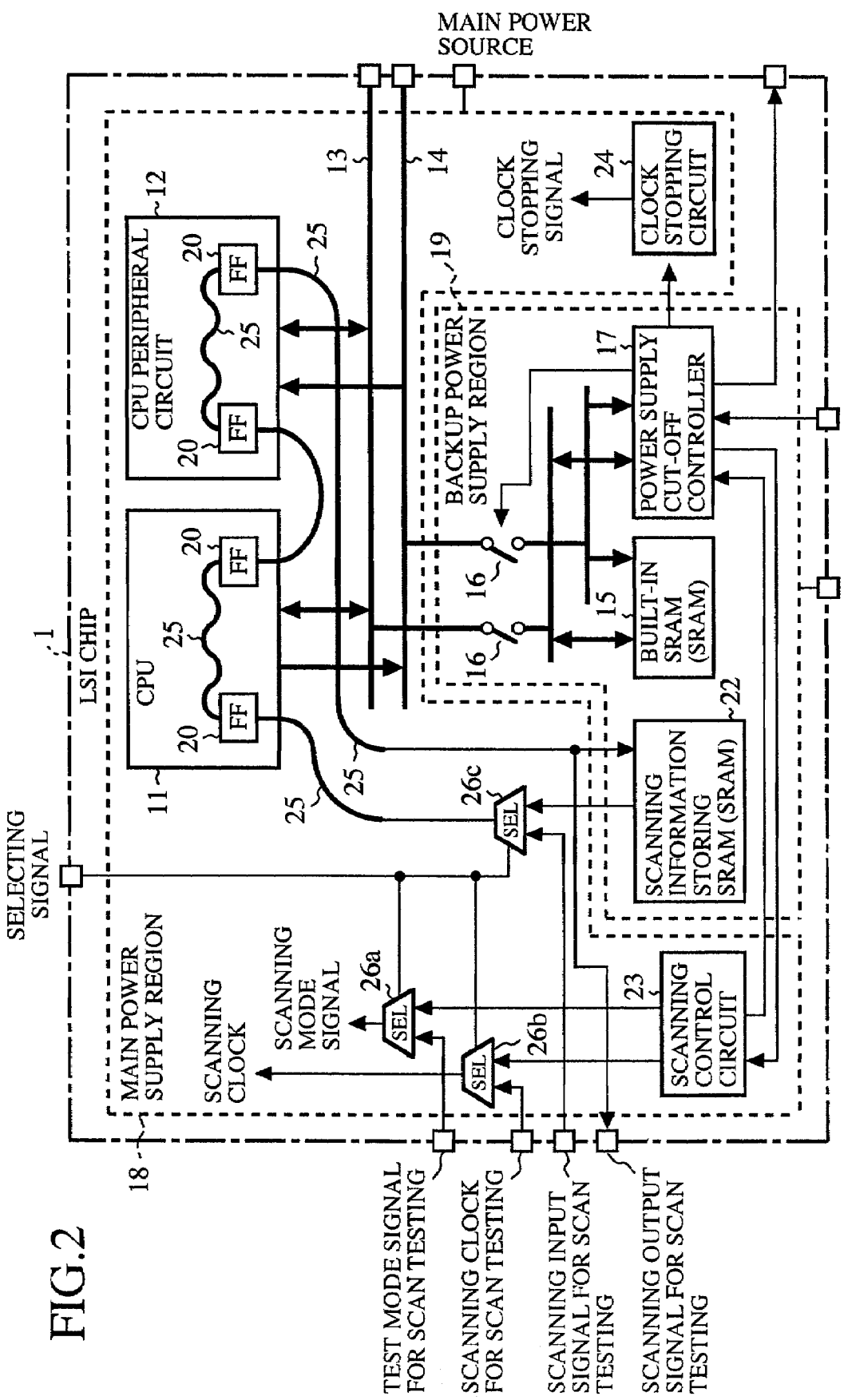
FIG. 2 is a block diagram showing an LSI chip, to which a leakage current reducing method of an LSI according to a second embodiment of the invention is applied.

FIG. 2 is a block diagram showing an LSI chip 1, to which the leakage current reducing method of an LSI according to the second embodiment of the invention is applied. Here, only the internal configuration of the LSI chip 1 is shown. In the drawing, a reference numeral 1 denotes an LSI chip; 11 a CPU; 12 a CPU peripheral circuit; 13 a data bus; 14 an address bus/control signal line; 15 a built-in SRAM; 16 an internal current cut-off switch; 17 a power supply cut-off controller; 18 a main power supply region; 19 a backup power supply region; 20 a memory unit; 22 a scanned information storing SRAM; 23 a scanning control circuit; and 24 a clock stopping circuit. These portions are similar to those of the first embodiment shown in FIG. 1, and are denoted by like reference numerals. Thus, detailed description thereof will be omitted.

A reference numeral 25 denotes a scan path provided to cascade-connect FF units as memory units 20 of the CPU 11, the CPU peripheral circuit 12 and so on, in the form of a shift register, and reduce leakage current when the LSI chip 1 is placed in an operation standby state or returned from the standby state. However, this scan path is different from the scan path 21 of the first embodiment described above with reference to FIG. 1 in that the scan path 25 is the one, which has been prepared for testing the LSI chip 1. Reference numerals 26a to 26c denote selectors for switching signals when the scan path 25 is used both for reducing leakage current and testing the LSI chip 1. Specifically, the selector 26a performs switching between a scan mode signal from the scanning control circuit 23 and a scan mode signal for scan testing; the selector 26b switching between a scanning clock from the scanning control circuit 23 and a clock for scan testing; and the selector 26c switching between a scanning input signal from the scanned information storing SRAM 22 and a scanning input signal for scan testing.

Next, the operation of an LSI as configured above will now be described as below.

In the testing of the LSI chip 1 carried out by the scan path 25 used for both leakage current reduction and LSI testing as described above, a test mode signal for scan testing, a clock pulse and a scanning input signal are entered from the unit outside the LSI chip 1, and selection of each of the selectors 26a to 26c is switched based on a selection signal. Accordingly, a test mode signal for scan testing, and a scanning clock for scan testing are respectively outputted from the selectors 26a and 26b, while a scanning input signal for scan testing selected by the selector 26c is entered to the scan path 25. Then, each of the memory units 20 in the CPU 11, the CPU peripheral circuit 12 or the like are scanned, and a scanning output signal for testing is outputted through the scan path 25 to the external unit so as to check these memory units thereby. Testing of the LSI chip 1 using the scan path 25 has been employed for many LSI chips, as it facilitates value setting and observation of the memory unit 20 of the CPU 11, the CPU peripheral circuit 12 or the like in the LSI chip 1.

On the other hand, when the scan path 25 is used for scanning designed to reduce leakage current of the LSI chip 1, the selectors 26a to 26c are switched based on a selection signal. A test mode signal from the scanning control circuit 23 is selected by the selector 26a, and a scanning clock from the scanning control circuit 23 is selected by the selector 26b. The selector 26c selects a scanning input signal from the scanned information storing SRAM 22, and enters the signal to the scan path 25. Thereafter, by executing a scanning operation using the scan path 25, as in the case of the first embodiment, when the LSI chip 1 is placed in an operation standby state, information held in the memory unit 20 of the CPU 11, the CPU peripheral circuit 12 or the like is saved in the scanned information storing SRAM 22. When the LSI chip 1 is returned from the standby state, the information having been saved in the scanned information storing SRAM 22 is set in the memory unit 20 of the CPU 11, the CPU peripheral circuit 12 or the like.

As described above, according to the second embodiment, the scan path 25 is used both for testing the LSI chip 1 and reducing leakage current during information saving/returning. Thus, it is not necessary to provide any new scan paths for reducing leakage current when the system is placed in the standby state or returned from the standby state in the CPU 11, the CPU peripheral circuit 12 or the like. As a result, the increase of a circuit area in the LSI chip 1 can be prevented.

Third Embodiment

Figure 3:
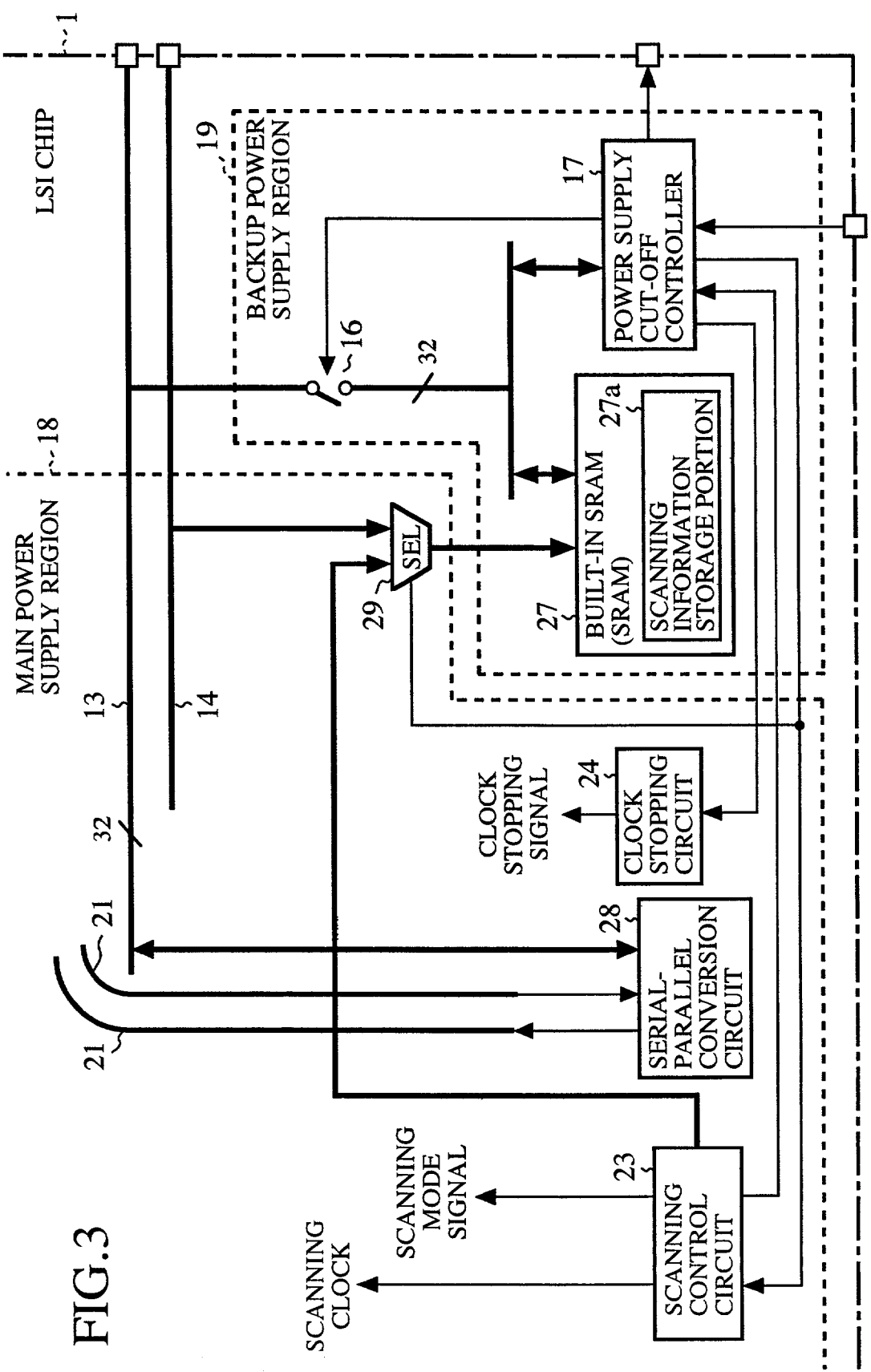
FIG. 3 is a block diagram showing main portions of an LSI chip, to which a leakage current reducing method of an LSI according to a third embodiment of the invention is applied.

In the foregoing first embodiment, the information read by the scanning operation through the scan path 21 was stored in the separately prepared scanned information storing SRAM 22. However, a part of the built-in SRAM used for a normal operation may be used as a scanned information storage portion for storing the information read by the scanning operation. FIG. 3 is a block diagram showing the main portions of an LSI chip 1, to which the leakage current reducing method of an LSI according to the third embodiment of the invention is applied. Portions similar to those of the first embodiment shown in FIG. 1 are denoted by like reference numerals, and description thereof will be omitted. In the described case, the CPU 11 employs a 32-bit data bus 13.

In the drawing, a reference numeral 27 denotes a built-in SRAM (SRAM) used for a normal operation. This SRAM is different from the built-in SRAM 22 of the first embodiment shown in FIG. 1 in that a part of the SRAM is used as a scanned information storage portion 27a for storing information read by the scanning operation through the scan path 21. A reference numeral 28 denotes a serial-parallel conversion circuit for converting the information read by the scanning operation through the scan path 21 from serial information into 32-bit parallel information, and outputting the thus converted information to the data bus 13, and for converting 32-bit parallel information read from the scanned information storage portion 27a of the built-in SRAM 27 through the data bus 13 into serial information, and sending the thus converted information to the scan path. A reference numeral 29 denotes a selector for selecting an address and a control signal contained in an SRAM control signal outputted from the scanning control circuit 23 or an address and a control signal outputted from the CPU 11 to the address bus/control signal line 14, and inputting the thus selected data into the built-in SRAM 27.

Next, the operation of an LSI chip as configured above will now be described as below.

Based on a signal from the power supply cut-off controller 17, the address/control signal line 14 side is actuated during a normal operation, and the selector 29 sends an address and a control signal from the CPU 11 to the built-in SRAM 27. Accordingly, data during the normal operation of the built-in SRAM 27 is written from the data bus 13 through the internal current cut-off switch 16 in the region thereof.

On the other hand, when the system is placed in an operation standby state or returned from the standby state, based on a signal from the power supply cut-off controller 17, the scanning control circuit 23 side is actuated, and thereafter an address and a control signal contained in an SRAM control signal outputted from the scanning control circuit 23 are sent to the built-in SRAM 27 by way of the selector 29. Accordingly, the address of a region used as the scanned information storage portion 27a within the built-in SRAM 27 is specified, and information during the change to the standby state or the returning from the standby state is written into or read from the scanned information storage portion 27a. In this case, in the built-in SRAM 27 necessary for the normal operation of the CPU 11, multi-bit data bus connection is made (32 bits in the example shown). On the other hand, in the scan path 21, the information of the memory unit 20 of the CPU 11 or the like is entered/outputted by 1-bit unit. The-serial-parallel conversion circuit 28 absorbs such a difference in bit width.

Next, the operations of the serial-parallel conversion circuit 28 and the scanning control circuit 23 will be described in detail.

When the system is placed in an operation standby state, the serial-parallel conversion circuit 28 first receives 32 pieces of information of the memory unit 20 of the CPU 11 or the like through the scan path 21. Then, the serial information having been entered through the scan path 21 is converted into 32-bit parallel information, and outputted to the data bus 13. The scanning control circuit 23 outputs an SRAM control signal in matching with the operation of outputting the 32-bit parallel information to the data bus 13, carried out by the serial-parallel conversion circuit 28. The SRAM control signal is then sent through the selector 29 controlled in accordance with a signal from the power supply cut-off controller 17 to the built-in SRAM 27. The scanning control signal is composed of an address and a control signal such that scanned information can be stored in the proper region of the scanned information storage portion 27a of the built-in SRAM 27. Accordingly, the 32-bit parallel information having been outputted to the data bus 13 is stored in the address-specified scanned information storage portion 27a of the built-in SRAM 27 by way of the internal current cut-off switch 16. The above-described processing is repeated until information scanning is finished for all the memory units 20 of the CPU 11 and the CPU peripheral circuit 12.

When the system is returned from the standby state, the 32-bit information is read from the scanned information storage portion 27a of the built-in SRAM 27, address-specified based on the SRAM control signal from the scanning control circuit 23, through the data bus 13 into the serial-parallel conversion circuit 28. The SRAM control signal is composed of an address and a control signal such that the scanned information stored in the proper region of the scanned information storage portion 27a of the built-in SRAM 27 can be outputted. The serial-parallel conversion circuit 28 converts the read 32-bit parallel information into serial information, and sequentially sends such converted pieces of information to the scan path 21. The information thus outputted to the scan path 21 is set in the memory unit 20 of the CPU 11 or the CPU peripheral circuit 12 in the main power supply region 18. The above-described processing is repeated until information before the change to the standby state is set in all the memory units 20 of the CPU 11.

Generally, the SRAM is frequently used for holding the intermediate result of CPU processing. Thus, information to be saved in the operation standby state is usually a part of the total capacity of the SRAM. In this case, a region of the SRAM in the operation standby state, in which no data holding is necessary, can be used as a scanned information storage portion. If all pieces of information must be saved, the memory capacity of the SRAM should be increased by an amount necessary for storing scanned information, so that the increased part is used as a scanned information storage portion. In the SRAM, the total designated area occupied by an address decoder is not small. Therefore, even if the memory capacity is increased, a chip area can be reduced compared with a case where two SRAM units (built-in SRAM, and scanned information storing SRAM) are independently provided.

As described above, according to the third embodiment, a partial region of the built-in SRAM 27 disposed in the backup power supply region 19 is used as the scanned information storage portion. Accordingly, it is not necessary to provide any scanned information storing SRAM units in the backup power supply region 19. As a result, leakage current can be reduced without increasing the chip size.

Fourth Embodiment

Figure 4:
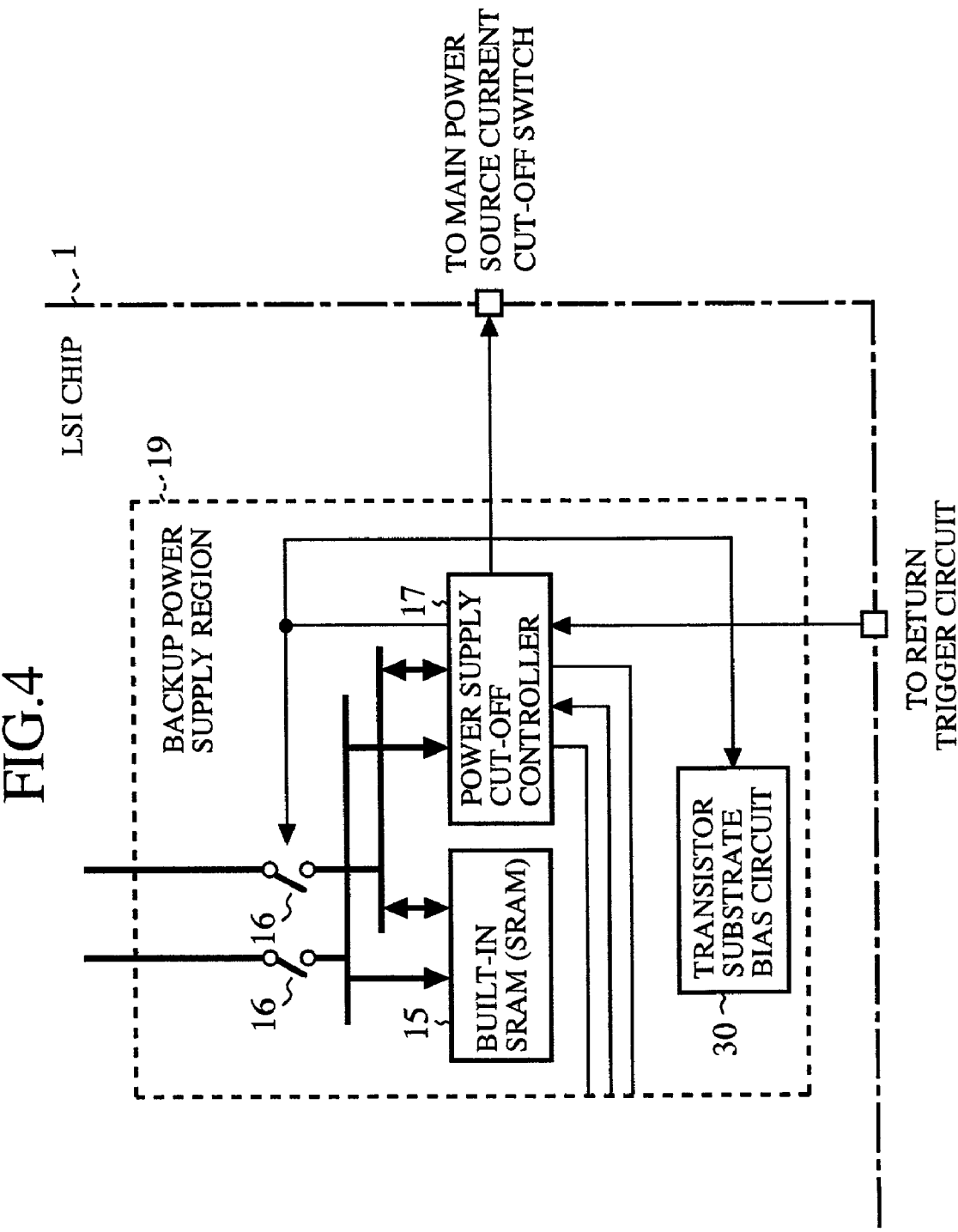
FIG. 4 is a block diagram showing main portions of an LSI chip, to which a leakage current reducing method of an LSI according to a fourth embodiment of the invention is applied.

The leakage current reducing method of the LSI of the first embodiment can be combined with the other leakage current reducing method of an LSI, e.g., the one designed to increase the substrate bias voltage of each transistor in the backup power supply region 19 in the operation standby state. FIG. 4 is a block diagram showing the main portions of an LSI chip, to which the leakage current reducing method of an LSI according to the fourth embodiment of the invention is applied. Portions similar to those of the first embodiment shown in FIG. 1 are denoted by like reference numerals, and description thereof will be omitted.

In the drawing, a reference numeral 30 denotes a transistor substrate bias circuit provided in the backup power supply region 19, and adapted to control the substrate bias voltage of each transistor in the backup power supply region 19. This transistor substrate bias circuit 30 is controlled based on a control signal from the power supply cut-off controller 17, which is also supplied to the internal current cut-off switch 16. The method for controlling the substrate bias voltage of a transistor, which is used to reduce the leakage current of each MOS transistor in the operation standby state, has been available in the related art, e.g., one described in Japanese Patent Application Laid-Open No. 1993-108194, "LOW POWER CONSUMPTION TYPE SEMICONDUCTOR INTEGRATED CIRCUIT". Thus, detailed description of the method will be omitted. Next, the operation of an LSI chip as configured above will now be described as below.

The substrate bias voltages of all the MOS transistors in the backup power supply region 19 are changed by controlling the substrate bias circuit 30. Specifically, when the LSI chip 1 is placed in an operation standby state, the power supply cut-off controller 17 generates a control signal for turning off the internal current cut-off switch 16, and also outputs this control signal to the transistor substrate bias circuit 30 provided in the backup power supply region 19. The transistor substrate bias circuit 30 is actuated based on the control signal as a trigger, and the substrate bias voltages of all the MOS transistors in the backup power supply region 19 are increased. As a result, high operation thresholds are set for the MOS transistors, making it possible to reduce leakage current while the LSI chip 1 is in the operation standby state.

On the other hand, during the normal operation of the LSI chip 1, the transistor substrate bias circuit 30 is controlled based on a control signal from the power supply cut-off controller 17, and the substrate bias voltages of all the MOS transistors in the backup power supply region 19 are lowered. Accordingly, the operation thresholds for the MOS transistors is set lower, thereby increasing the leakage current of the LSI chip 1. However, the operation speed of the MOS transistors can be made higher.

As describe above, according to the fourth embodiment, the substrate bias voltage of each transistor in the backup power supply region 19 is increased in the standby state. Thus, it is possible to further reduce leakage current.

Fifth Embodiment

Figure 5:
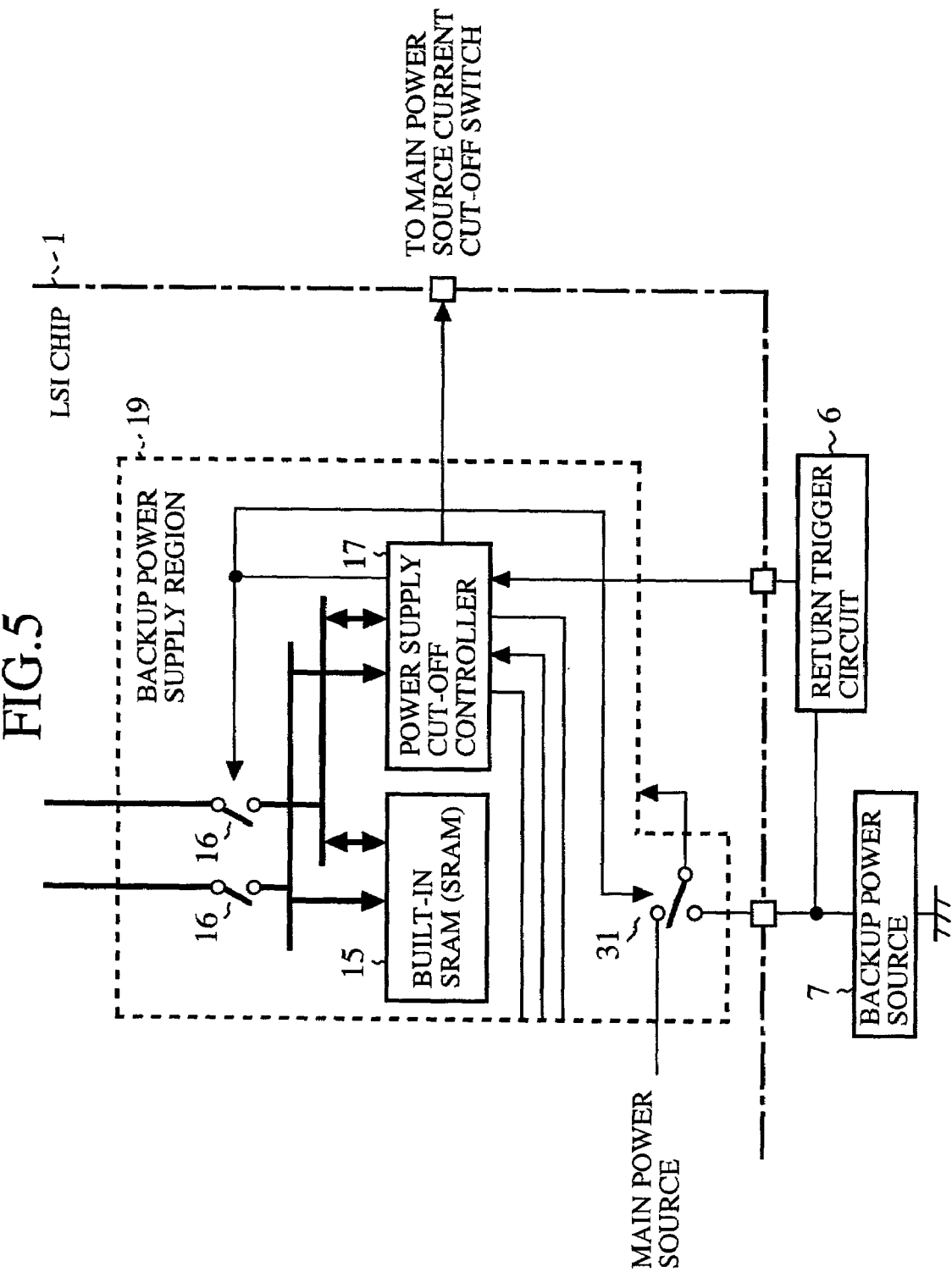
FIG. 5 is a block diagram showing main portions of an LSI chip, to which a leakage current reducing method of an LSI according to a fifth embodiment of the invention is applied.

In the foregoing first embodiment, power was supplied to the backup power supply region 19 from the backup power source 5 having a voltage equal to that of the main power source 3. However, power may be supplied from the main power source 3 during the normal operation, and power may be supplied from the backup power source 5 having a voltage lower than that of the main power source 3 in the operation standby state. FIG. 5 is a block diagram showing the main portions of an LSI chip, to which the leakage current reducing method of an LSI according to the fifth embodiment of the invention is applied. Portions similar to those of the first embodiment shown in FIG. 1 are denoted by like reference numerals, and description thereof will be omitted.

In the drawing, a reference numeral 7 denotes a backup power source for supplying power to the backup power supply region 19 while the LSI chip 1 is in the operation standby state. This backup power source 7 is different from the backup power source 5 of the first embodiment shown in FIG. 1 in that a voltage thereof is set lower than that of the main power source 3, enough for holding the content of the built-in SRAM provided in the backup power supply region 19. A reference numeral 31 denotes a power source changeover switch for supplying power to each of the circuits in the backup power supply region 19 during the normal operation from the main power source 3, and from the backup power source 7 having a voltage lower than that of the main power source 3 when in the operation standby state. This power source changeover switch 31 is controlled by a control signal from the power supply cut-off controller 17, which is also supplied to the internal current cut-off switch 16.

Next, the operation of an LSI chip as configured above will now be described as below.

During the normal operation, the power source changeover switch 31 is controlled based on the same control signal as that supplied from the power supply cut-off controller 17 to the internal current cut-off switch 16. Power is supplied from the main power source 3 to the backup power supply region 19. Accordingly, during (the) normal operation, the transistor of each circuit in the backup power supply region 19 is operated by a high voltage supplied from the main power source 3. On the other hand, in the operation standby state, the power source changeover switch 31 is controlled based on the control signal from the power supply cut-off controller 17, and power is supplied from the backup power source 7 to the backup power supply region 19. In this case, the voltage of the backup power source 7 is set equal to a lowest limit necessary for maintaining the state of the FF or the SRAM in the backup power supply region 19. Accordingly, in the operation standby state, the transistor of each circuit in the backup power supply region 19 is operated by a low voltage supplied from the backup power source 7, and the content of the FF or the SRAM is maintained.

As described above, according to the fifth embodiment, since power supply to the backup power supply region 19 is carried out by a voltage lower than that of the main power source 3 from the backup power source 7 in the standby state, leakage current can be further reduced. In addition, since power supply to the backup power supply region 19 is carried out from the main power source 3 during the normal operation, the component durability of the backup power source 7 can be increased.

Sixth Embodiment

Figure 6:
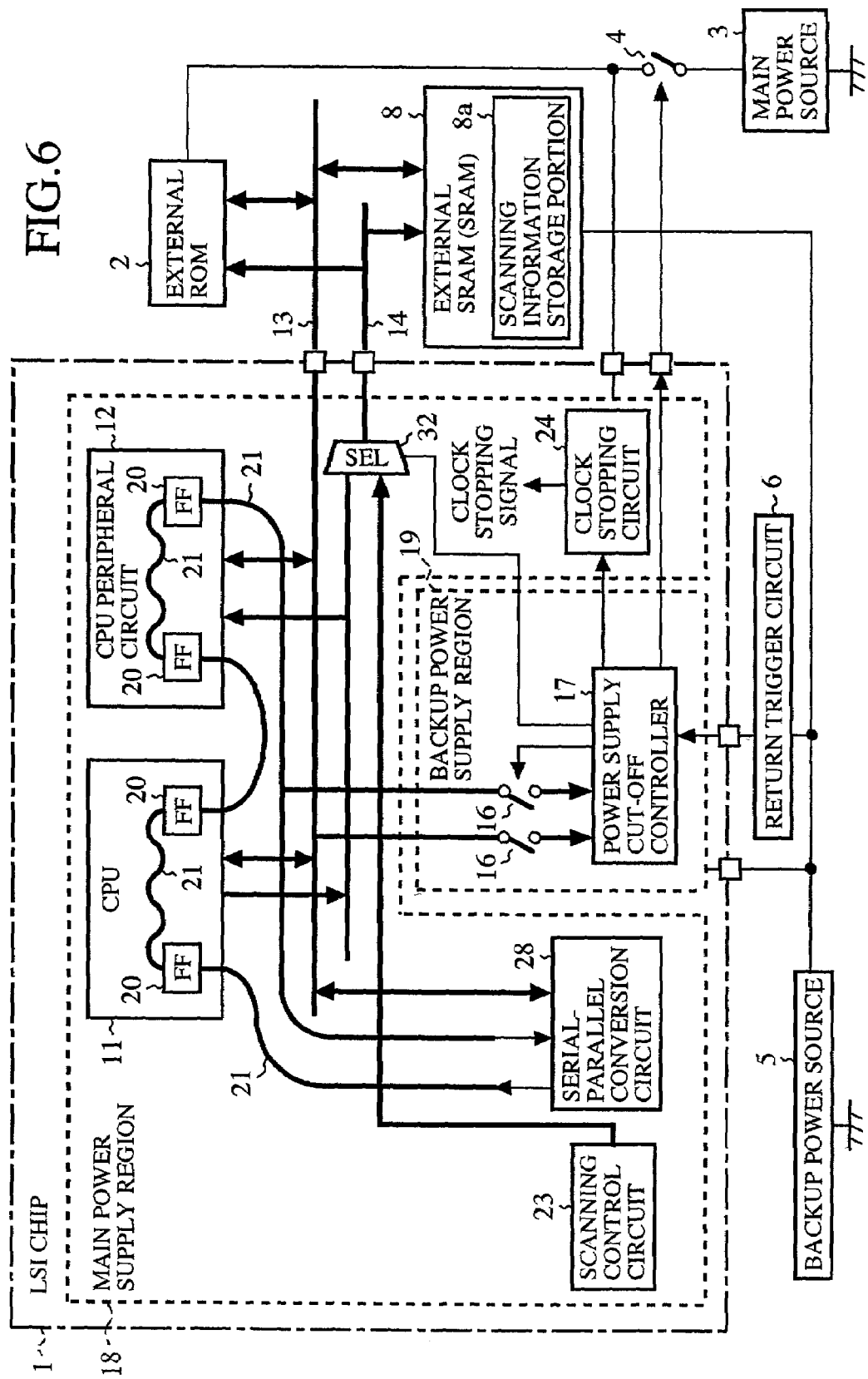
FIG. 6 is a block diagram showing an LSI chip, to which a leakage current reducing method of an LSI according to a sixth embodiment of the invention is applied.

In the foregoing third embodiment, the built-in SRAM 27 used for a normal operation was provided inside the LSI chip 1, and a part of the built-in SRAM 27 was used also as the scanned information storage portion 27a for storing the lo information read by the scanning operation. However, without providing any SRAM units inside the LSI chip 1, an external SRAM, a part thereof being used as a scanned information storage portion, may be provided outside the LSI chip 1. FIG. 6 is a block diagram showing the configuration of an LSI chip, to which the leakage current reducing method of an LSI according to the sixth embodiment of the invention is applied. Portions similar to those of the third embodiment shown in FIG. 3 are denoted by like reference numerals, and description thereof will be omitted.

In the drawing, a reference numeral 8 denotes an external SRAM connected to the outside of the LSI chip 1 through the data bus 13 and the address bus/control signal line 14, and adapted to receive power from the backup power source 5. A part of the external SRAM 8 is used as a scanned information storage portion 8a for storing information read by a scanning operation carried out through the scan path 21. A reference numeral 32 denotes a selector for selecting an address and a control signal contained in an SRAM control signal outputted from the scanning control circuit 23, or an address and a control signal outputted from the CPU 11 to the address bus/control signal line 14, and then inputting the thus selected data to the external SRAM 8.

Next, the operation of an LSI chip as configured above will now be described as below.

According to the sixth embodiment, the external SRAM 8 as an SRAM unit is disposed outside the LSI chip 1. Thus, an SRAM control signal from the scanning control circuit 23, or an address/control signal from the CPU 11 is selected by the selector 32, and then outputted to the external ROM 2 and the external SRAM 8 located outside the LSI chip 1. Specifically, when the system is placed in an operation standby state or returned from the standby state, the selector 32 selects an address and a control signal contained in the SRAM control signal from the scanning control circuit 23 in response to a signal from the power supply cut-off controller 17, and then outputs the thus selected data to the external SRAM 8. During a normal operation, in response to a signal from the power supply cut-off controller 17, the selector 32 selects an address and a control signal from the CPU 11, and then outputs the thus selected data to the external ROM 2 and the external SRAM 8. The other operations are similar to those of the third embodiment.

As described above, according to the sixth embodiment, a part of the external SRAM 8 connected to the outside of the LSI chip 1 is used as the scanned information storage portion 8a, and information read by a scanning operation is stored therein. Thus, without adding any SRAM units for storing scanned information inside the LSI chip 1, it is possible to reduce leakage current.

As apparent from the foregoing description, the present invention is advantageous in the following respects.

The memory unit of each circuit in the main power supply region is connected through the scan path provided in the LSI chip and, when the system is placed in the operation standby state, information in the memory unit of each circuit in the main power supply region, read by the scanning operation carried out through the scan path, is saved in the SRAM provided in the backup power supply region. Thus, it is possible to provide a leakage current reducing method of an LSI, capable of facilitating the saving of information not memory-mapped in the address of the CPU, saving and returning information by a relatively simple switching operation without needing any special switching operations by the CPU, and resuming an operation immediately after the change to the standby state.

The scanned information storing SRAM, separate from the built-in SRAM, is provided in the backup power supply region and, information read by using the scan path in the operation standby state is saved in the scanned information storing SRAM. Thus, information not memory-mapped in the address of the CPU can be easily saved, information saving and returning can be performed by a relatively simple switching operation, and an operation can be resumed immediately after the change to the standby state.

The scan path originally prepared for testing the LSI chip is used for leakage current reduction. Thus, it is not necessary to add any other scan paths for reducing leakage current when the system is placed in the operation standby state or returned from the standby state, making it possible to prevent the increase of a circuit area.

When the system is placed in the standby state, information in the memory unit of each circuit in the main power supply region, read through the scan path, is subjected to serial-to-parallel conversion, and saved in the address-specified scanned information storage portion set up by using a part of the built-in SRAM. When the system is returned from the standby state, the address of the scanned information storage portion is sent to the built-in SRAM, and information read therefrom is subjected to parallel-to-serial conversion, and then set in the memory unit. Thus, it is not necessary to provide any SRAM units for storing scanned information in the backup power supply region, making it possible to reduce leakage current without increasing the chip area.

In the operation standby state, it is arranged such that the substrate bias voltage of the transistor in the backup power supply region is increased. Thus, the threshold for the transistor is set high, making it possible to further reduce leakage current.

Power is supplied to the backup power supply region from the main power source during the operation, and from the backup power source having a voltage lower than that of the main power source in the operation standby state. Thus, an operation voltage is lowered in the standby state, making it possible to further reduce leakage current. Moreover, since the backup power supply region receives power from the main power source during the normal operation, the durability of the backup power source can be improved.

Furthermore, when the system is placed in the operation standby state, information in the memory unit of each circuit in the main power supply region, read through the scan path, is subjected to serial-to-parallel conversion, and then saved in the specified address of the external SRAM, which receives power from the backup power source. When the system is returned from the standby state, information read from the specified address of the external SRAM is subjected to parallel-to-serial conversion, and then set in the memory unit. Thus, it is not necessary to provide any SRAM units for storing scanned information in the backup power supply region, making it possible to reduce leakage current without increasing the chip area.

What is claimed is:

1. A leakage current reducing method of an LSI for reducing leakage current in an LSI chip divided into two parts; namely a main power supply region including circuits operated by receiving power from a main power source, and a backup power supply region including circuits operated by receiving power from a backup power source, said LSI chip having a scanning control circuit and a power supply cut-off controller built-in to the LSI chip, said method comprising the steps of:
   connecting memory units in each of the circuits provided in the main power supply region through a scan path;
   starting a scanning operation, when the LSI chip is placed in an operation standby state, through the scan path, and reading information held in the memory units of each of the circuits provided in the main power supply region based upon a scan mode signal and a scanning clock pulse; and
   saving the information thus read by the scanning operation in a built-in storage section provided in the backup power supply region.

2. The leakage current reducing method according to claim 1, wherein said built-in storage section is formed by an SRAM.

3. The leakage current reducing method according to claim 1, wherein said step of saving is conducted into a scanned information storage section which is separately provided from said built-in storage section, in a case where said built-in storage section is used for a normal operation.

4. The leakage current reducing method according to claim 3, wherein said scanned information storage section is formed by an SRAM.

5. The leakage current reducing method according to claim 3, wherein a scan path originally prepared for testing the LSI chip is used as the scan path for reading information held in the memory units of each of the circuits provided in the main power supply region.

6. The leakage current reducing method according to claim 1, wherein a part of said built-in storage section provided in the back up power supply region is used as a scanned information storage portion for storing the information read by the scanning operation, said method comprising the steps of:
   starting the scanning operation, when the LSI chip is placed in the standby state, through the scan path, serially reading the information held in the memory units of each of the circuits provided in the main power supply region, converting the read serial information into parallel information, and saving the thus converted parallel information in specified addresses of the scanned information storage portion of the built-in storage section; and
   parallely reading, when the LSI chip is returned from the standby state, the information held in the scanned information storage portion of the built-in storage section by specifying addresses therefor, converting the read parallel information into serial information, and setting the serial information through the scan path in the memory units of each of the circuits provided in the main power supply region.

7. The leakage current reducing method according to claim 3, wherein said built-in storage section and said scanned information storage section are each formed by an SRAM.

8. The leakage current reducing method according to claim 1 comprising a step of increasing a substrate bias voltage of a transistor of each of the circuits provided in the backup power supply region while the LSI chip is in the operation standby state.

9. The leakage current reducing method according to claim 1, comprising the steps of:
   presetting a voltage of the backup power source to be lower than a voltage of the main power source, yet enough for holding the content of the storage section provided in the backup power supply region; and
   supplying power to the backup power supply region from the main power source in a normal operation state, and from the backup power source in an operation standby state.

10. The leakage current reducing method according to claim 3, wherein said built-in storage section is formed by an SRAM.

11. A leakage current reducing method of an LSI for reducing leakage current in an LSI chip divided into two parts; namely a main power supply region including circuits operated by receiving power from a main power source, and a backup power supply region including circuits operated by receiving power from a backup power source, said LSI chip having a scanning control circuit and a power supply cut-off controller built-in to the LSI chip, said method comprising the steps of:

disposing an external storage section operated by receiving power from the backup power source outside the LSI chip, and connecting memory units of each of the circuits provided in the main power supply region through a scan path;

starting a scanning operation, when the LSI chip is placed in an operation standby state, through the scan path, serially reading information held in the memory units of each of the circuits provided in the main power supply region based upon a scan mode signal and a scanning clock pulse, converting the read serial information into parallel information, and then saving the parallel information in the external storage section by specifying addresses therefor; and parallely reading, when the LSI chip is returned from the standby state, the information held in the external storage section by specifying addresses therefor, converting the read parallel information into serial information, and then setting the serial information in the memory units of each of the circuits provided in the main power supply region through the scan path.

12. The leakage current reducing method according to claim 11, wherein a part of said external storage section is used as a scanned information storage section for storing the information read by the scanning operation.

13. The leakage current reducing method according to claim 1, wherein the scanning control circuit generating the scan mode signal and scanning clock pulse.

14. The leakage current reducing method according to claim 11, wherein the scanning control circuit generating the scan mode signal and scanning clock pulse.

* * * * *